United States Patent
Kim et al.

(10) Patent No.: US 11,677,115 B2
(45) Date of Patent: Jun. 13, 2023

(54) BATTERY MODULE AND BATTERY PACK INCLUDING SAME

(71) Applicant: LG Chem, Ltd., Seoul (KR)

(72) Inventors: Kyung-Mo Kim, Daejeon (KR); Jeong-O Mun, Daejeon (KR); Ho-June Chi, Daejeon (KR); Jin-Yong Park, Daejeon (KR); Jung-Hoon Lee, Daejeon (KR)

(73) Assignee: LG Energy Solution, Ltd.

( * ) Notice: Subject to any disclaimer, the term of this patent is extended or adjusted under 35 U.S.C. 154(b) by 60 days.

(21) Appl. No.: 16/622,143

(22) PCT Filed: Dec. 12, 2018

(86) PCT No.: PCT/KR2018/015796
§ 371 (c)(1),
(2) Date: Dec. 12, 2019

(87) PCT Pub. No.: WO2019/124869
PCT Pub. Date: Jun. 27, 2019

(65) Prior Publication Data
US 2020/0127250 A1    Apr. 23, 2020

(30) Foreign Application Priority Data
Dec. 20, 2017 (KR) .................. 10-2017-0176338

(51) Int. Cl.
*H01M 50/22* (2021.01)
*H01M 50/207* (2021.01)
(Continued)

(52) U.S. Cl.
CPC ......... *H01M 50/22* (2021.01); *H01M 50/147* (2021.01); *H01M 50/169* (2021.01);
(Continued)

(58) Field of Classification Search
CPC ............ H01M 50/229; H01M 50/224; H01M 50/147; H01M 50/26; H01M 50/166;
(Continued)

(56) References Cited

U.S. PATENT DOCUMENTS

| 4,592,972 A | * | 6/1986 | Juergens | ............... | H01M 50/26 |
| | | | | | 429/160 |
| 5,242,767 A | * | 9/1993 | Roback | ................. | H01M 50/20 |
| | | | | | 429/97 |

(Continued)

FOREIGN PATENT DOCUMENTS

| CN | 104716278 A | | 6/2015 | | |
| CN | 105142968 A | * | 12/2015 | .......... | H01M 50/394 |

(Continued)

OTHER PUBLICATIONS

International Search Report for PCT/KR2018/015796 dated Mar. 19, 2019.

(Continued)

*Primary Examiner* — Matthew T Martin
*Assistant Examiner* — Jessie L. Walls
(74) *Attorney, Agent, or Firm* — Lerner David LLP

(57) ABSTRACT

A battery module, which includes at least one battery cell and a module case for packaging the at least one battery cell, wherein the module case includes: a top cover configured to cover an upper side of the at least one battery cell; and a side plate configured to cover all of opposing side surfaces of the top cover and opposing side surfaces of the at least one battery cell and configured to be coupled to the top cover by fitting.

9 Claims, 8 Drawing Sheets

(51) Int. Cl.
    *H01M 50/204* (2021.01)
    *H01M 50/229* (2021.01)
    *H01M 50/224* (2021.01)
    *H01M 50/26* (2021.01)
    *H01M 50/147* (2021.01)
    *H01M 50/169* (2021.01)
    *H01M 50/202* (2021.01)
    *H01M 50/211* (2021.01)
    *H01M 50/28* (2021.01)
    *H01M 50/242* (2021.01)
    *H01M 50/276* (2021.01)
    *H01M 50/278* (2021.01)

(52) U.S. Cl.
    CPC ....... *H01M 50/204* (2021.01); *H01M 50/207* (2021.01); *H01M 50/211* (2021.01); *H01M 50/224* (2021.01); *H01M 50/229* (2021.01); *H01M 50/242* (2021.01); *H01M 50/26* (2021.01); *H01M 50/276* (2021.01); *H01M 50/278* (2021.01); *H01M 50/28* (2021.01); *H01M 50/202* (2021.01)

(58) Field of Classification Search
    CPC .. H01M 50/20; H01M 50/207; H01M 50/211; H01M 50/202; H01M 50/169
    See application file for complete search history.

(56) References Cited

U.S. PATENT DOCUMENTS

| | | | |
|---|---|---|---|
| 2003/0211382 A1* | 11/2003 | Aoyama | H01M 50/213 429/96 |
| 2004/0137321 A1 | 7/2004 | Savaria et al. | |
| 2006/0166089 A1 | 7/2006 | Suzuki et al. | |
| 2006/0176014 A1* | 8/2006 | Moon | H01M 50/209 320/112 |
| 2006/0222942 A1* | 10/2006 | Zhao | H01M 50/15 429/180 |
| 2009/0098452 A1 | 4/2009 | Takahashi et al. | |
| 2010/0258538 A1* | 10/2010 | Suzuki | B23K 26/02 219/121.14 |
| 2013/0270981 A1 | 10/2013 | Shishido et al. | |
| 2014/0087246 A1* | 3/2014 | Yamamoto | H01M 10/0525 429/179 |
| 2015/0024260 A1* | 1/2015 | Kwak | H01M 50/10 429/163 |
| 2015/0072209 A1* | 3/2015 | Tyler | H01M 10/6551 429/121 |
| 2015/0140413 A1* | 5/2015 | Suzuki | H01M 10/0525 429/163 |
| 2015/0228936 A1* | 8/2015 | Kajiwara | H01M 50/103 429/163 |
| 2017/0062782 A1 | 3/2017 | Cho et al. | |
| 2017/0190264 A1 | 7/2017 | Kim et al. | |
| 2017/0301905 A1* | 10/2017 | Takeda | H01M 10/0525 |
| 2018/0090734 A1* | 3/2018 | Tsuruta | H01M 50/20 |

FOREIGN PATENT DOCUMENTS

| | | | | |
|---|---|---|---|---|
| CN | 205069724 U | | 3/2016 | |
| CN | 206040766 U | | 3/2017 | |
| CN | 106992272 A | | 7/2017 | |
| EP | 3190642 A1 | | 7/2017 | |
| JP | S46001851 Y1 | | 1/1971 | |
| JP | S56050054 U | | 5/1981 | |
| JP | S573366 A | | 1/1982 | |
| JP | S62234684 A | | 10/1987 | |
| JP | 200275293 A | | 3/2002 | |
| JP | 2002184373 A | | 6/2002 | |
| JP | 2003257388 A | | 9/2003 | |
| JP | 2006508503 A | | 3/2006 | |
| JP | 2009087554 A | | 4/2009 | |
| JP | 4639819 B2 | | 2/2011 | |
| JP | 2013091085 A | | 5/2013 | |
| JP | 2013143332 A | | 7/2013 | |
| JP | 2014010910 A | | 1/2014 | |
| KR | 19980015447 U | * | 6/1998 | ............. B23K 20/10 |
| KR | 200396717 Y1 | | 9/2005 | |
| KR | 20070099566 A | | 10/2007 | |
| KR | 101037739 B1 | | 5/2011 | |
| KR | 20130117672 A | | 10/2013 | |
| KR | 20150049959 A | | 5/2015 | |
| KR | 20170030954 A | | 3/2017 | |
| KR | 20170082041 A | | 7/2017 | |

OTHER PUBLICATIONS

European Search Report for Application No. 18891720.7, dated Nov. 9, 2020, 7 pages.
Chinese Search Report for Application No. 201880045504.1 dated Nov. 16, 2021, 2 pages.

* cited by examiner

BATTERY MODULE AND BATTERY PACK INCLUDING SAME

CROSS-REFERENCE TO RELATED APPLICATIONS

The present application is a national phase entry under 35 U.S.C. § 371 of International Application No. PCT/KR2018/015796, filed Dec. 12, 2018, which claims priority to Korean Patent Application No. 10-2017-0176338 filed on Dec. 20, 2017 in the Republic of Korea, the disclosures of which are incorporated herein by reference.

TECHNICAL FIELD

The present disclosure relates to a battery module and a battery pack including the battery module.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery cells configuring the battery module or the battery pack are generally pouch-type secondary batteries that may be easily stacked on one another.

The conventional battery module generally includes at least one battery cell and a module case for packaging the at least one battery cell. Here, the module case includes a top cover for covering an upper side of the at least one battery and a side plate coupled to the top cover to cover both side surfaces and a lower side of the at least one battery cell. In the conventional battery module, the top cover and the side plate of the module case are both made of metal material and coupled to each other by welding.

However, recently, in order to reduce the weight of the battery module according to the slimming trend, the top cover tends to be made of a plastic composite material. In this case, it is important to secure the coupling strength when the top cover made of plastic and the side plate made of metal are welded. Moreover, since a non-metal material and a metal material are welded, checking the welding quality during the welding process is also considered as an important issue in manufacturing.

DISCLOSURE

Technical Problem

The present disclosure is directed to providing a battery module, which may secure the coupling strength of a top cover and a side plate of a module case when welding, and a battery pack including the battery module.

In addition, the present disclosure is also directed to providing a battery module, which may allow each inspection of welding quality when the top cover and the side plate of the module case are welded, and a battery pack including the battery module.

Moreover, the present disclosure is also directed to providing a battery module, which may allow a welding process to be performed without a closely-adhering guide jig when the top cover and the side plate of the module case are welded, and a battery pack including the battery module.

Technical Solution

In one aspect of the present disclosure, there is provided a battery module, which includes at least one battery cell and a module case for packaging the at least one battery cell, wherein the module case includes: a top cover configured to cover an upper side of the at least one battery cell; and a side plate configured to cover all of opposing side surfaces of the top cover and opposing side surfaces of the at least one battery cell and configured to be coupled to the top cover by fitting.

At least one fitting rib fitted with the side plate when the top cover is coupled to the side plate may be formed at the opposing side surfaces of the top cover.

The at least one fitting rib may include a plurality of fitting ribs, and the plurality of fitting ribs may be disposed to be spaced apart from each other by a predetermined distance to form a predetermined gap therebetween.

The top cover and the side plate may be welded to each other after being fitted.

The plurality of fitting ribs may be melted and deformed due to the welding to fill the predetermined gap.

The predetermined gap may be exposed to an outside of the module case.

At least one anti-deformation rib may be formed at a lower surface of the top cover to prevent the side plate from being deformed when the at least one battery cell swells.

At least one anti-deformation rib insert groove may be formed in the side plate so that the at least one anti-deformation rib is inserted therein when the top cover is coupled to the side plate.

The top cover may be made of a plastic composite material, and the side plate may be made of a metal material.

In another aspect of the present disclosure, there is also provided a battery pack, comprising: at least one battery module according to the above embodiment; and a pack case configured to package the at least one battery module.

Advantageous Effects

According to various embodiments as above, it is possible to provide a battery module, which may secure the coupling strength of a top cover and a side plate of a module case when welding, and a battery pack including the battery module.

In addition, according to various embodiments of the present disclosure, it is possible to provide a battery module, which may allow each inspection of welding quality when the top cover and the side plate of the module case are welded, and a battery pack including the battery module.

Moreover, according to various embodiments of the present disclosure, it is possible to provide a battery module, which may allow a welding process to be performed without a closely-adhering guide jig when the top cover and the side plate of the module case are welded, and a battery pack including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
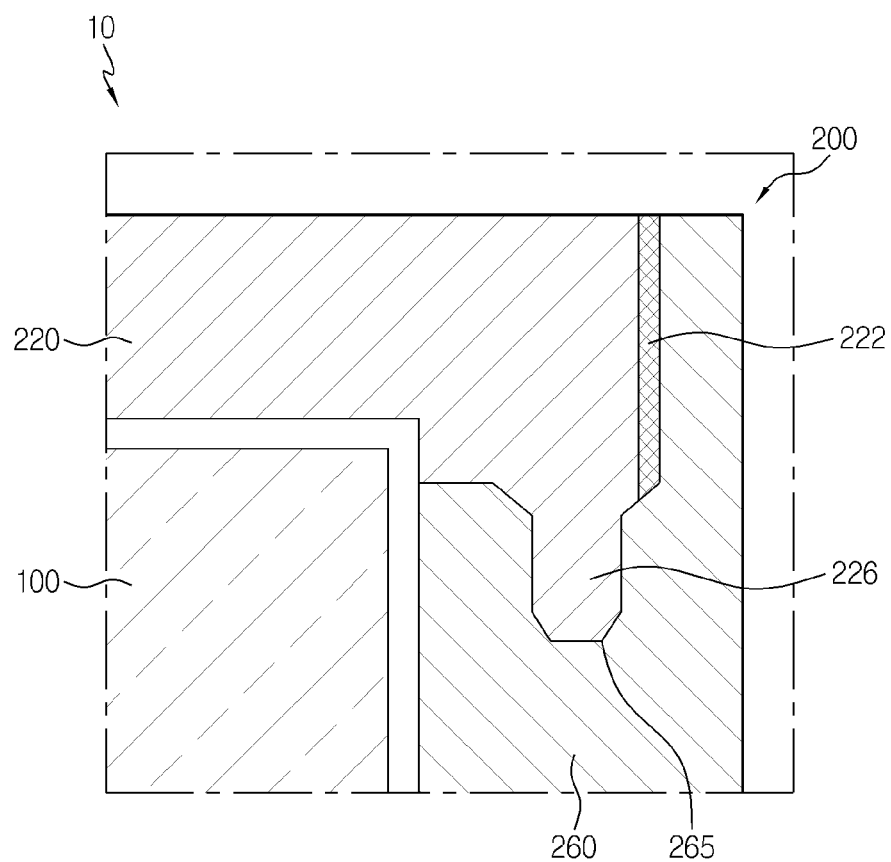
FIG. 1 is a side sectional view illustrating a battery module according to an embodiment of the present disclosure.
Figure 2:
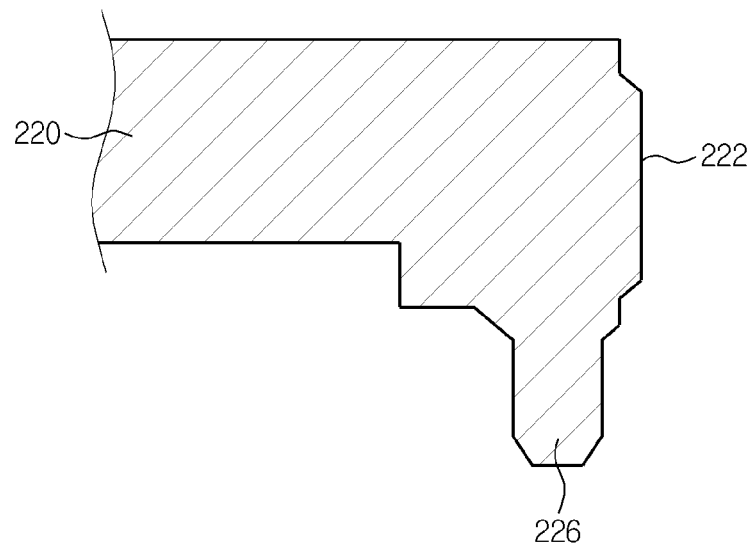
FIG. 2 is a side sectional view illustrating a top cover of a module case of the battery module of FIG. 1.
Figure 3:
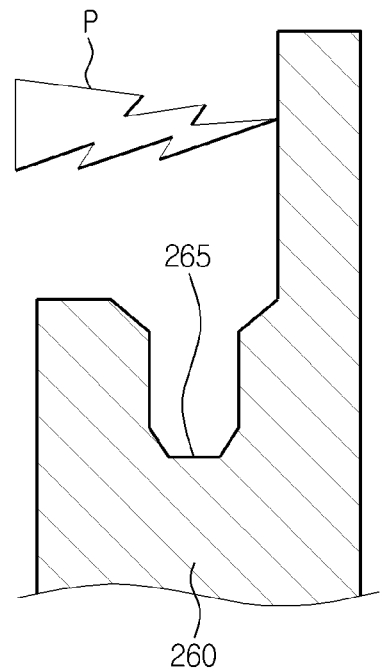
FIG. 3 is a side sectional view illustrating a side plate of the module case of the battery module of FIG. 1.

FIG. 1 is a diagram for illustrating a battery module according to an embodiment of the present disclosure, FIG. 2 is a diagram for illustrating a top cover of a module case of the battery module of FIG. 1, and FIG. 3 is a diagram for illustrating a side plate of the module case of the battery module of FIG. 1.

Referring to FIGS. 1 to 3, a battery module 10 may include a battery cell 100 and a module case 200.

The battery cell 100 may be provided solely or in plural. The battery cell 100 may be a secondary battery, for example a pouch-type secondary battery.

The module case 200 is for packaging the battery cell 100 and may have an accommodation space for accommodating the battery cell 100. The module case 200 may include a top cover 220 and a side plate 260.

The top cover 220 may cover an upper side of the battery cell 100. The top cover 220 may be made of a plastic material to meet the need for a lightweight product according to the recent slimmer trend. As an example, the top cover 220 may be made of a reinforced plastic, for example GFRP (Glass Fiber Reinforced Plastic).

The top cover 220 may have a fitting rib 222 and an anti-deformation rib 226.

The fitting rib 222 is provided at both side surfaces of the top cover 220 and may be coupled to the side plate 260, explained later, by fitting. The fitting rib 222 may be provided solely or in plural.

Figure 4:
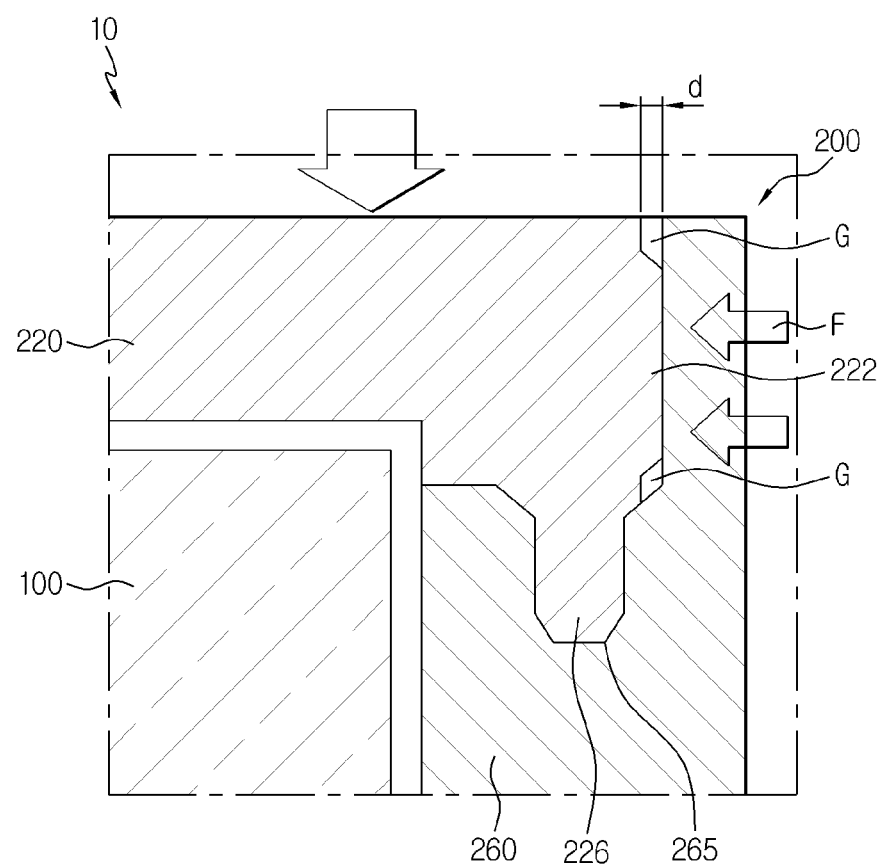
FIGS. 4 and 5 are side and top sectional views, respectively, illustrating an assembling process before the module case of the battery module of FIG. 1 is welded.
Figure 5:
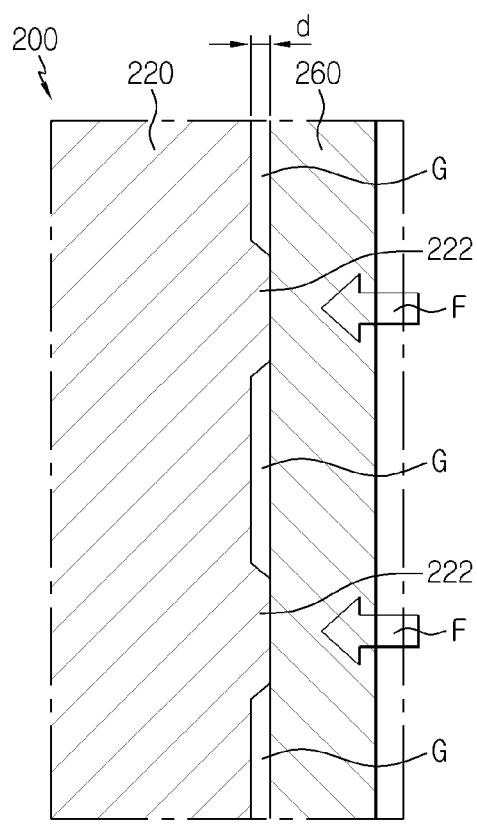

The plurality of fitting ribs 222 may be spaced apart from each other by a predetermined distance to form a predetermined gap G (see FIGS. 4 and 5). The predetermined gap G (see FIGS. 4 and 5) may be filled as the fitting ribs 222 are melted and deformed due to welding S (see FIGS. 6 to 8), explained later. That is, the plurality of fitting ribs 222 may be melted and deformed due to the welding S, explained later, to fill the predetermined gap G.

The anti-deformation ribs 226 may be provided at a lower surface of the top cover 220 to prevent the side plate 260, explained later, from being deformed due to the swelling, when the battery cell 100 swells.

The side plate 260 may cover all of both opposing side surfaces of the top cover 220 and both opposing side surfaces of the battery cell 100. Also, the side plate 260 may cover a bottom portion of the battery cell 100. That is, the module case 200 may cover the bottom portion of the battery cell 100 by means of the side plate 260 instead of a separate bottom cover.

The side plate 260 may be made of a metal material, for example an aluminum material. The side plate 260 may be coupled to the top cover 220 by fitting and welding. Specifically, the side plate 260 and the top cover 220 may be coupled to each other by being fitted and then welded to each other.

Laser patterning P may be performed on a welding interface of the side plate 260, which is welded with the top plate 220. At this time, since there is no structure capable of disturbing the laser patterning P in front of the welding interface of the side plate 260, any problem such as interfering with the laser patterning P may not occur.

The side plate 260 may have an anti-deformation rib insert groove 265.

The anti-deformation rib insert groove 265 is provided at an upper side of the side plate 260, and the anti-deformation rib 226 may be inserted into the anti-deformation rib insert groove 265. As the anti-deformation rib 226 is inserted, it is possible to minimize the risk that the side plate 260 is deformed due to compression caused by expansion of the battery cell 100 when the battery cell 100 swells.

Hereinafter, the assembling process of the module case 200 of the battery module 10 according to this embodiment will be described in more detail.

FIGS. 4 and 5 are diagrams for illustrating an assembling process before the module case of the battery module of FIG. 1 is welded.

Referring to FIGS. 4 and 5, first, a worker or the like arranges the battery cell 100 at the inner side of the side plate 260 and then presses the top cover 220 toward the side plate 260 from the upper side of the battery cell 100 so that the top cover 220 and the side plate 260 are coupled to each other.

At this time, due to the plurality of fitting ribs 222 of the top cover 220, the top cover 220 and the side plate 260 may be fitted with each other.

Accordingly, a pressing force F caused by the fitting, namely a restoring force F, is generated at the side plate 260 so that the side plate 260 presses the top cover 220 in a horizontal direction of the top cover 220.

Meanwhile, predetermined gaps G may be formed between the plurality of fitting ribs 222 and at upper and lower sides of the plurality of fitting ribs 22, respectively. The predetermined gap G may have a width of approximately 0.5 mm, and the predetermined gap G may be exposed, i.e. visible, to an outside of the module case 200 to be observed by a user.

The worker or the like may easily confirm whether the fitting is properly performed by checking the width of the predetermined gap G by the naked eye and comparing the shape and size of the width.

Figure 6:
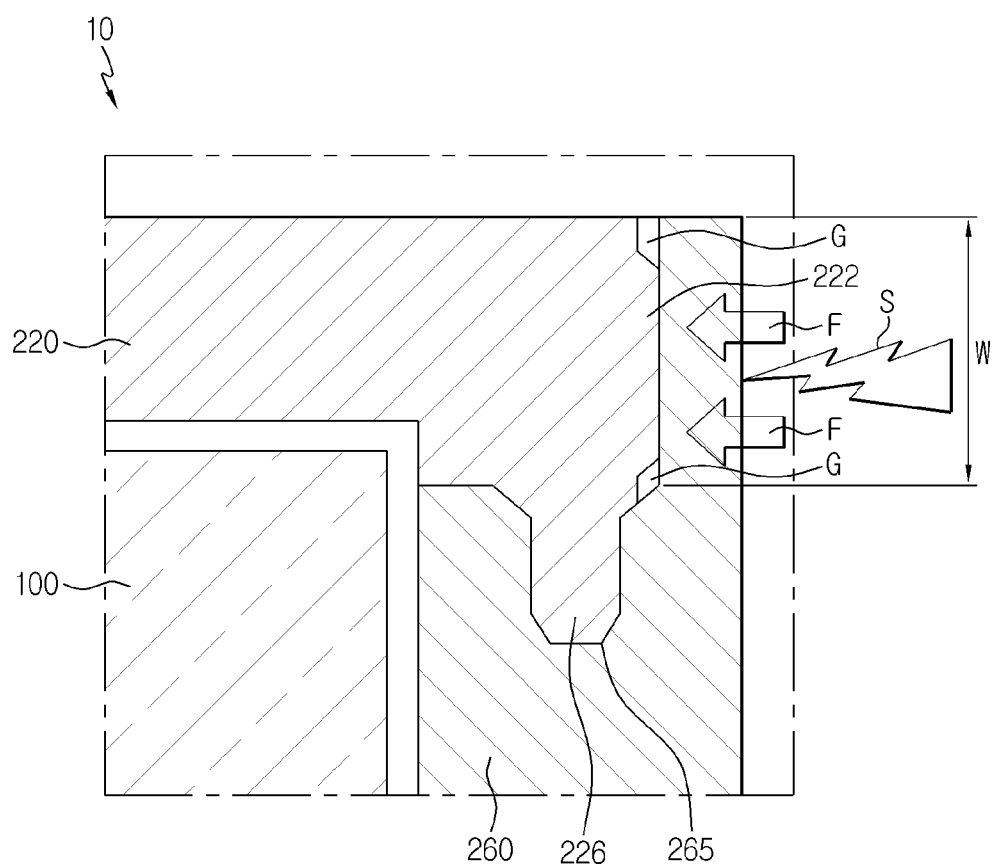
FIG. 6 is a side sectional view illustrating a process of welding the module case of the battery module of FIG. 1.

FIG. 6 is a diagram for illustrating a process of welding the module case of the battery module of FIG. 1.

Referring to FIG. 6, the worker or the like may additionally couple the side plate 260 and the top cover 220 through the welding S at the outer side of the upper side of the side plate 260. The welding S may be laser welding performed by irradiating a laser beam.

When the welding S is performed, since the side plate 260 presses the top cover 220 due to the restoring force F of the side plate 260, a closely-adhering guide jig for welding may not be separately required, and the welding strength may be secured sufficiently at the welding S.

Meanwhile, the worker and the like should secure a predetermined welding bead width so that the welding S is performed smoothly. In this embodiment, since a structure or a pressing jig capable of obstructing the welding S outside the side plate 260 is not disposed, it may be easy to secure the welding bead width W. Here, the welding bead width W may be about 6 mm or more.

Figure 7:
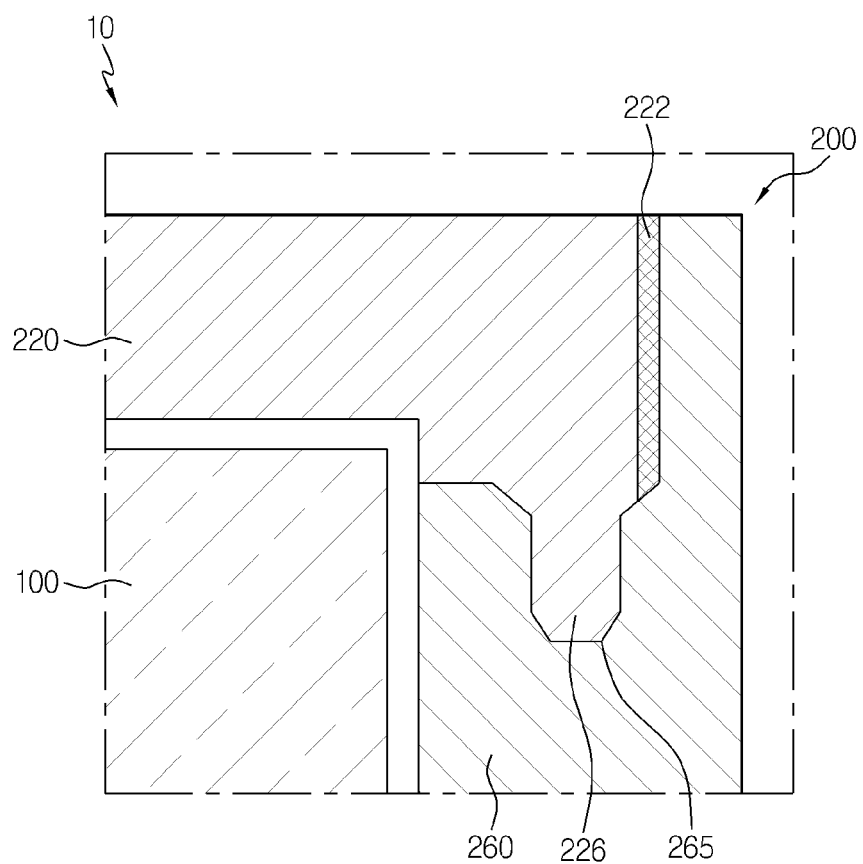
FIGS. 7 and 8 are side and top sectional views, respectively, illustrating the appearance of the module case of the battery module of FIG. 1 after welding.
Figure 8:
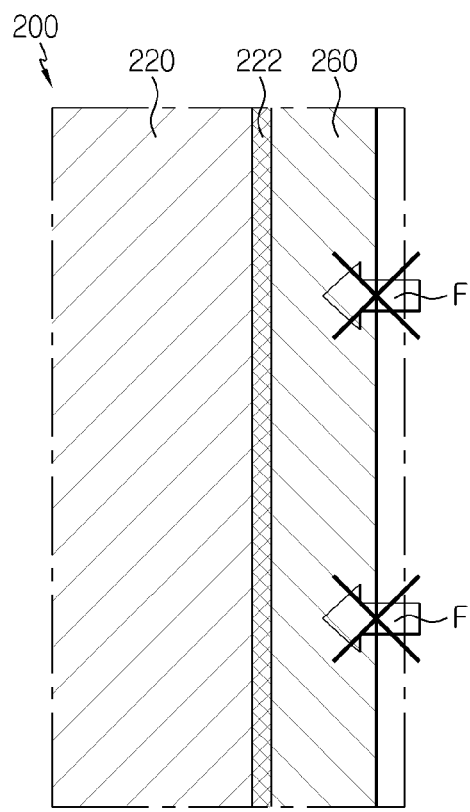

FIGS. 7 and 8 are diagrams for illustrating the appearance of the module case of the battery module of FIG. 1 after welding.

Referring to FIGS. 7 and 8, the plurality of fitting ribs 222 of the top cover 220 may be deformed into a spreading form due to the melting caused by the welding S to fill all of the predetermined gaps G. Meanwhile, if the predetermined gap G is entirely filled by the plurality of fitting ribs 222 prior to the welding S (see FIG. 6), the restoring force F of the side plate 260 may be lost.

In addition, the worker or the like may easily confirm the quality of the welding S by visually checking the degree to which the predetermined gap G is filled. In case of normal welding, the worker or the like may visually confirm whether all of the predetermined gaps G are filled. In addition, if the welding is not performed sufficiently, namely if the welding is weak, the worker or the like will see that the predetermined gap G does not disappear. Moreover, if the welding is more than necessary, namely in case of over-welding, the worker or the like will judge this phenomenon from boiling of bubbles or the like at the welding interface.

As described above, in this embodiment, it is possible to simply check the quality of the welding S through the predetermined gap G, which may be observed by the naked eye of the user when the welding S is performed.

Figure 9:
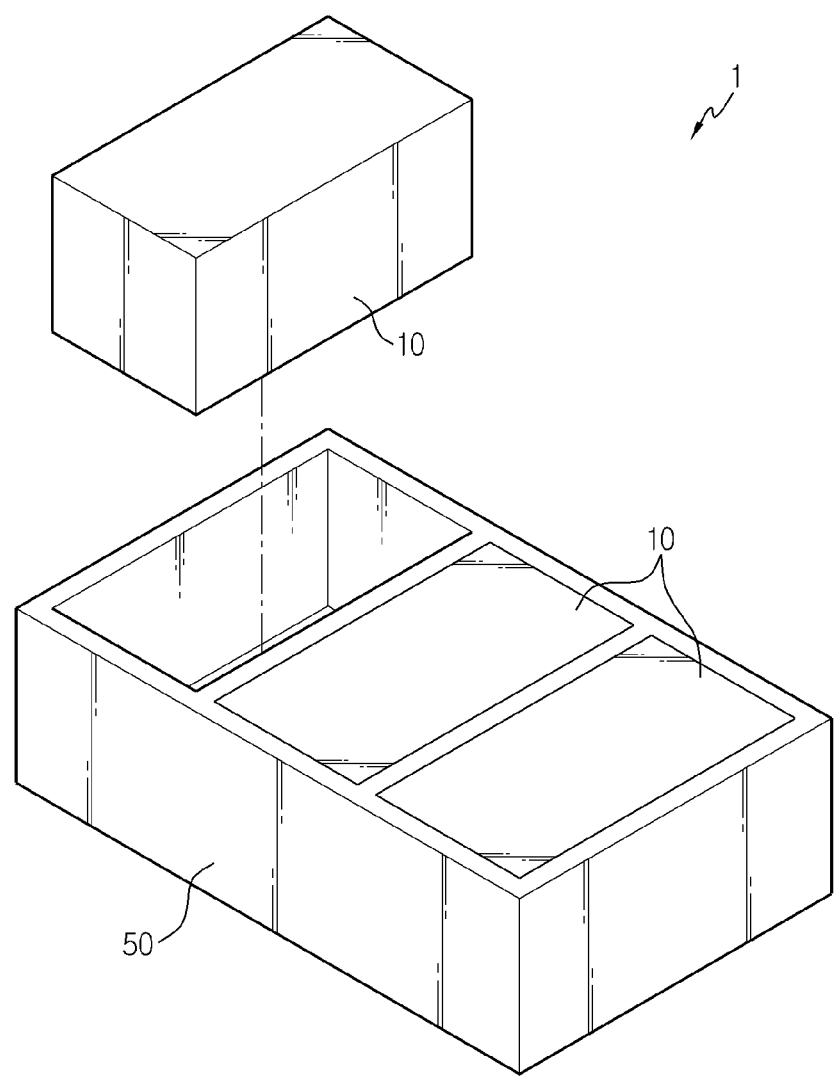
FIG. 9 is a perspective view illustrating a battery pack according to an embodiment of the present disclosure.

FIG. 9 is a diagram for illustrating a battery pack according to an embodiment of the present disclosure.

Referring to FIG. 9, a battery pack 1 may include at least one battery module 10 according to the former embodiment and a pack case 50 for packaging the at least one battery module 10.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10 as described above, and thus it is possible to implement a battery pack 1 having all the advantages of the battery module 10 described above, or devices, instruments, facilities or the like such as a vehicle, which have the battery pack 1.

According to various embodiments as above, it is possible to provide a battery module 10, which may secure the coupling strength of the top cover 220 and the side plate 260 of the module case 200 when welding, and a battery pack 1 including the battery module 10.

In addition, according to various embodiments of the present disclosure, it is possible to provide the battery module 10, which may allow each inspection of welding quality when the top cover 220 and the side plate 260 of the module case 200 are welded, and a battery pack 1 including the battery module 10.

Moreover, according to various embodiments of the present disclosure, it is possible to provide a battery module 10, which may allow a welding process to be performed without a closely-adhering guide jig when the top cover 220 and the side plate 260 of the module case 200 are welded, and a battery pack 1 including the battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, which includes at least one battery cell and a module case for packaging the at least one battery cell, wherein the module case includes:
a top cover configured to cover an upper side of the at least one battery cell, the top cover having opposing side surfaces, wherein a plurality of side-facing fitting ribs is formed at each of the opposing side surfaces of the top cover; and
a side plate configured to cover all of the opposing side surfaces of the top cover, all of the plurality of side-facing fitting ribs formed at each of the opposing side surfaces of the top cover, and opposing side surfaces of the at least one battery cell, and configured to be coupled to the top cover by fitting,
wherein the plurality of side-facing fitting ribs formed at each of the opposing side surfaces of the top cover is configured to be fitted with the side plate when the top cover is coupled to the side plate,
wherein on each of the opposing side surfaces of the top cover, adjacent fitting ribs of the plurality of fitting ribs are disposed to be spaced apart from each other by a predetermined distance to form a predetermined gap between the adjacent fitting ribs, wherein the predetermined gap is exposed to an outside of the module case from a viewpoint extending from the top cover toward the side plate when the top cover is coupled to the side plate with the plurality of side-facing fitting ribs fitted with and covered by the side plate so that the plurality of fitting ribs and the predetermined gap are visible for observation.

2. The battery module according to claim 1, wherein the top cover and the side plate are welded to each other after being fitted.

3. The battery module according to claim 2, wherein the plurality of fitting ribs are melted and deformed due to the welding to fill the predetermined gap.

4. The battery module according to claim 1, wherein at least one anti-deformation rib is formed at a lower surface of the top cover to prevent the side plate from being deformed when the at least one battery cell swells.

5. The battery module according to claim 4, wherein at least one anti-deformation rib insert groove is formed in the side plate so that the at least one anti-deformation rib is inserted therein when the top cover is coupled to the side plate.

6. The battery module according to claim 1, wherein the top cover is made of a plastic composite material, and wherein the side plate is made of a metal material.

7. The battery module according to claim 6, wherein the plastic composite material is Glass Fiber Reinforced Plastic.

8. The battery module according to claim 6, wherein the metal material is aluminum.

9. A battery pack, comprising:

at least one battery module defined in claim 1; and a pack case configured to package the at least one battery module.

* * * * *